(12) United States Patent
Ross et al.

(10) Patent No.: US 9,069,134 B2
(45) Date of Patent: Jun. 30, 2015

(54) METHOD FOR PRODUCING AN OPTICAL SPLITTER CASCADE AND OPTICAL ASSEMBLY

(75) Inventors: Ludwig Ross, Stutensee (DE); Stefan Kufner, Kueps (DE); Maria Kufner, Kueps (DE); Wolfgang Foss, Kronau (DE); Marco Bock, Lauscha (DE); Frank Baetz, Meng-Haemmern (DE)

(73) Assignee: Leoni Kabel Holding GmbH, Nuremberg (DE)

( * ) Notice: Subject to any disclaimer, the term of this patent is extended or adjusted under 35 U.S.C. 154(b) by 503 days.

(21) Appl. No.: 13/472,910

(22) Filed: May 16, 2012

(65) Prior Publication Data

US 2012/0237161 A1  Sep. 20, 2012

Related U.S. Application Data

(63) Continuation of application No. PCT/EP2010/006930, filed on Nov. 15, 2010.

(30) Foreign Application Priority Data

Nov. 16, 2009  (DE) .................. 10 2009 053 056

(51) Int. Cl.
  *G02B 6/26* (2006.01)
  *G02B 6/42* (2006.01)
  *G02B 6/30* (2006.01)
  *G02B 6/125* (2006.01)
  *G02B 6/12* (2006.01)

(52) U.S. Cl.
  CPC ............ *G02B 6/30* (2013.01); *Y10T 29/49826* (2015.01); *G02B 2006/1215* (2013.01); *G02B 6/125* (2013.01)

(58) Field of Classification Search
  None
  See application file for complete search history.

(56) References Cited

U.S. PATENT DOCUMENTS

| 4,953,935 | A | 9/1990 | Suchoski, Jr. et al. | |
|---|---|---|---|---|
| 2003/0059158 | A1* | 3/2003 | Lacey | ............... 385/24 |
| 2006/0291782 | A1 | 12/2006 | Carpenter et al. | |

FOREIGN PATENT DOCUMENTS

| JP | 9230151 A | 9/1997 |
|---|---|---|
| WO | 2007/001924 A1 | 1/2007 |

OTHER PUBLICATIONS

International Search Report of PCT/EP2010/006930, Dated May 19, 2011.

* cited by examiner

*Primary Examiner* — Uyen Chau N Le
*Assistant Examiner* — John M Bedtelyon
(74) *Attorney, Agent, or Firm* — Laurence A. Greenberg; Werner H. Stemer; Ralph E. Locher

(57) ABSTRACT

An optical assembly, which is in particular in the form of a splitter component with a so-called splitter forming a passive optical component, is produced particularly inexpensively. In a first step a plurality of splitters are produced on a common wafer by forming a corresponding conductor track pattern. In a second step optical fibers are coupled simultaneously to the connection sides of the individual splitters with the aid of a connection carrier. Then, in a third step the individual splitters with the connection carriers connected thereto are separated form one another. Only one common coupling operation for a large number of splitters is required. The splitters may then be connected to form a splitter cascade.

10 Claims, 3 Drawing Sheets

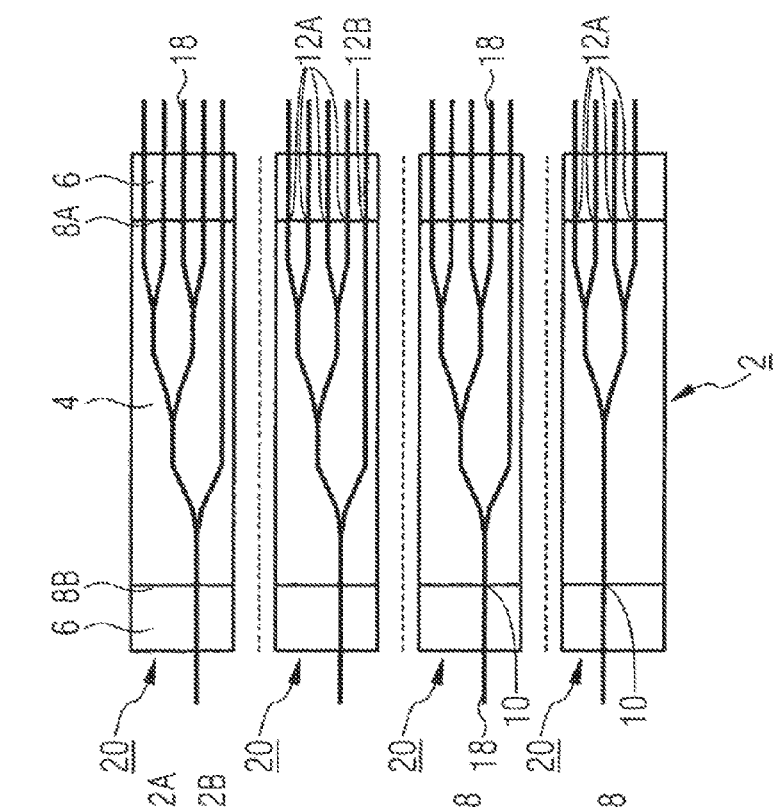
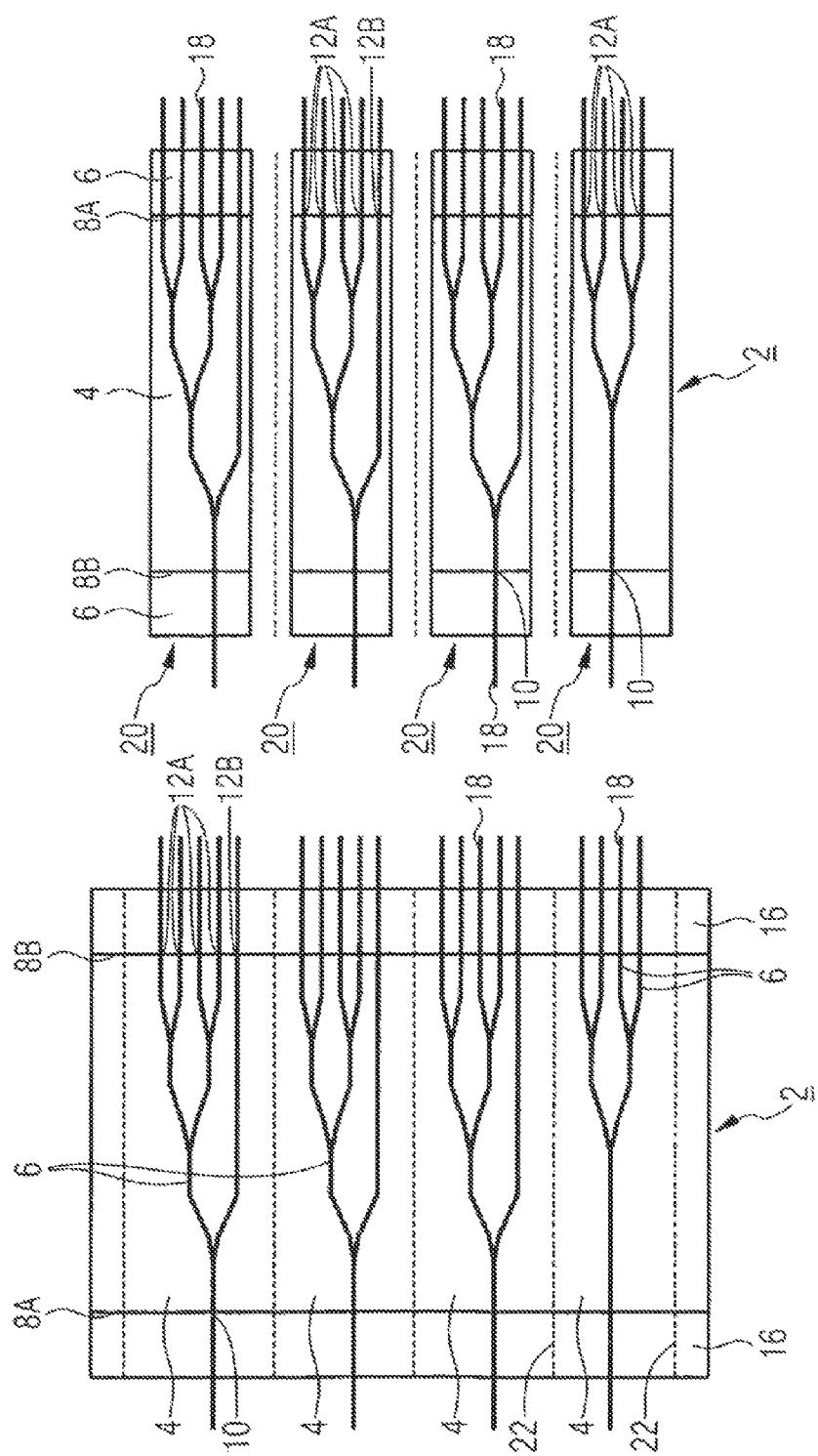

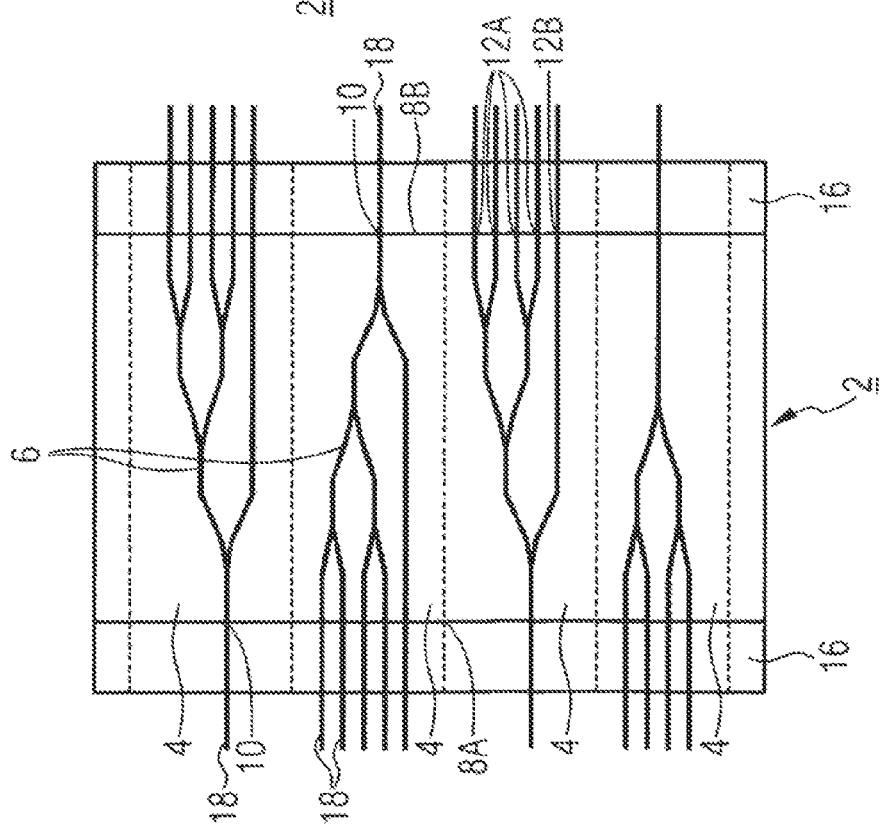

METHOD FOR PRODUCING AN OPTICAL SPLITTER CASCADE AND OPTICAL ASSEMBLY

CROSS-REFERENCE TO RELATED APPLICATION

This application is a continuation, under 35 U.S.C. §120, of copending international application No. PCT/EP2010/006930, filed Nov. 15, 2010, which designated the United States; this application also claims the priority, under 35 U.S.C. §119, of German patent application DE 10 2009 053 056.8, filed Nov. 16, 2009; the prior applications are herewith incorporated by reference in their entirety.

BACKGROUND OF THE INVENTION

Field of the Invention

The invention relates to a system and a method for producing an optical assembly with an optical component, in particular a passive component, such as a splitter. The invention further relates to such an optical assembly and in particular a so-called splitter cascade, i.e. a number of splitters matched to one another.

When distributing an optical data signal among a large number of consumers, so-called splitters are used as passive optical components. The splitters split the optical signal fed into the component part via a fiberoptic cable over a plurality of outputs, at which the signal is again fed into outgoing optical waveguides. One application case is, for example, splitting of an optical signal or a fiberoptic cable in the region of the end consumers over a plurality of households. In particular, provision is often made for a residual signal to be simultaneously looped through and supplied to a further splitter, in which further splitting then takes place in order to supply further end consumers.

A plurality of splitters which are connected to one another in such a way and in which some of the outputs are designed as consumer outputs and one of the outputs is provided for looping through the residual signal to the next splitter are referred to as a splitter cascade.

The optical components are sometimes also referred to as "chips" based on the designation for electrical component parts.

In order to produce the optical component parts, an optical waveguide structure is generally applied to a carrier substrate, in particular to a specially suited glass. This is performed, for example, by masking with a subsequent ion exchange process, with the result that ions enter the glass substrate in the uncovered regions so as to produce the optical conductor tracks. Other deposition techniques such as, for example, CVD (chemical vapor deposition) can likewise be used.

The splitters in the form of planar component parts typically have a length in a range between 10 mm and 60 mm, for example. The individual conductor tracks on the output side are generally arranged in a predetermined grid with respect to one another. The grid pitch, for example, is 125 μm (more precisely 127 μm) or 250 μm or a multiple thereof.

In the case of such optical components, coupling the input-side and the output-side optical fibers is associated with a high degree of complexity and accounts for a considerable proportion of the production costs.

SUMMARY OF THE INVENTION

It is accordingly an object of the invention to provide a method of producing a splitter cascade and a corresponding splitter cascade which overcome the above-mentioned disadvantages of the heretofore-known devices and methods of this general type and which provides for the possibility of producing an optical assembly with such an optical component part which is as efficient as possible.

With the foregoing and other objects in view there is provided, in accordance with the invention, a method for producing a splitter cascade formed of a plurality of optical assemblies, each including a respective optical component. The novel method comprises:

in a first step, forming a plurality of optical components in the form of splitters on a common wafer, each splitter having an optical conductor track pattern that opens out on a connection side and having at least one conductor track which splits into a plurality of output-side conductor tracks;

in a second step, coupling optical fibers to the respective optical conductor track pattern simultaneously at a plurality of the splitters; and subsequently separating the individual components with the coupled optical fibers from one another;

connecting a plurality of splitters to form a splitter cascade, wherein the conductor track patterns are formed such that the splitters of the splitter cascade each have an input, a plurality of consumer outputs and a loop-through output, except for a last splitter of the splitter cascade only having the consumer outputs, and such that a same optical intensity is present at all consumer outputs of the splitter cascade during operation, the optical intensity being lower than the respective intensity at the loop-through output, and/or that the total intensity provided at the consumer outputs of each splitter is identical, a respective loop-through output being connected to the input of a subsequent splitter.

In other words, provision is made, in a first step, in particular simultaneously a plurality of components to be formed on a common wafer (carrier substrate) and hereby for the respective optical conductor track patterns of the component to be produced. In the case of a splitter, this is conventionally a branching conductor track which branches from one input on an input side into at least two or preferably more outputs on an output side. In the second step, the optical fibers are then simultaneously coupled to the respective inputs and/or outputs at a plurality of, preferably at all of the components formed on the common wafer, before finally, in a third step, the individual components are separated from one another.

It is of particular advantage here that the optical fibers are not coupled to the individual components but to the entirety of the components connected to one another, with the result that, therefore, in each case only one coupling operation is provided for a large number of connections between the individual outputs and/or the inputs and the fibers to be connected. In this case, use is advantageously made of the fact that, owing to the preferably lithographic structuring, the individual conductor tracks are aligned with high precision on the wafer and therefore simultaneous common coupling of the optical fibers is made possible.

Expediently, for coupling which is as simple as possible, the optical fibers lie in a common connection carrier, the so-called input or output fiber array. Preferably, the fibers are arranged in longitudinal grooves, in particular in so-called V-shaped notches, for positionally accurate arrangement. Furthermore, this connection carrier is expediently formed in two parts, i.e. has a partition plane. In a base part, the longitudinal grooves are incorporated, for example, on an upper side and are covered with the aid of a second part, a cover part. In this case, the fibers are generally fixed in the grooves by an adhesive introduced into the remaining free space. In this case, the connection carrier has a planar connection side, with which it is coupled areally to a likewise planar, common connection side of the components. The connection carrier is overall in the form of a right-parallelepiped, for example.

In a preferred configuration, the optical fibers are coupled to opposite end sides of the components with the aid of a respective connection carrier. Therefore, in this preferred configuration, optical fibers are coupled both on the input side and on the output side.

As an alternative to this, a preferred configuration provides that in principle only one-sided fiber coupling is performed and only a deflecting element is arranged on the opposite end side. In this variant embodiment, both the input and all of the outputs, in particular for the connections of the optical fibers, are on only one end side. The applied input signal is fed back into the optical component and distributed to the outputs via the deflecting element on the opposite end side.

A 3-inch wafer with a diameter of approximately 7.5 cm, for example, is used as wafer, with a plurality of optical components being formed simultaneously on said wafer. Before the input or output fiber arrays (connection carriers) are coupled, the wafer is preferably treated with the result that a flat, input-side connection side and a flat, output-side connection side are formed. Then, the input fiber array and the output fiber array are coupled to these flat connection sides, respectively. This is performed by means of adhesive bonding with a suitable adhesive, for example. The meeting end faces of the wafer, on the one hand, and the connection carrier, on the other hand, are preferably polished in this case for coupling which is as effective as possible.

The components are in particular in the form of splitters, and the conductor track pattern has one or more input-side conductor tracks, which are combined, for example, first to form a common conductor track and then are split into a plurality of output-side conductor tracks. The conductor track pattern is in this case formed in such a way that the total intensity of an optical signal applied on the input side during operation is split over the output-side conductor tracks in a defined manner, i.e. corresponding to a desired, set ratio. In particular, a uniform distribution is provided. The splitters are generally in the form of M×N splitters, where M is the number of inputs and N is the number of outputs.

In a preferred configuration, a plurality of and preferably all of the optical components on the wafer are matched to one another in order to form jointly a splitter cascade. Preferably, provision is made here for the structuring and production of the conductor tracks on the individual components to be performed in such a way that defined splitting of the intensity of an optical signal applied during operation takes place, in particular in such a way that in each case the same optical intensity of the signal is present at the consumer outputs. The splitters are therefore preferably asymmetrical. An asymmetrical formation is understood to mean that the intensity splitting from the input to the outputs is asymmetrical in order to provide a loop-through output in addition to consumer outputs. In order to split the signal, Y-junctions are generally formed. At the first junction, the signal is split asymmetrically between a loop-through conductor track and a consumer conductor track. The signal of the consumer conductor track is then split preferably symmetrically by further subsequent Y junctions.

Expediently, the total number of outputs is uneven. In addition to the one loop-through output, therefore, an even number of consumer outputs is preferably provided, for example two or four. Alternatively, a plurality of loop-through outputs can also be provided. Only in the case of the last splitter of the splitter cascade is there preferably no longer a loop-through output provided, but only consumer outputs.

The asymmetrical splitting of the intensity (at the first junction) is in this case performed by virtue of a corresponding configuration of the geometric dimensions of the conductor tracks produced, i.e. the asymmetrical intensity splitting is performed in such a way that the two outgoing conductor tracks of the Y junction have a different diameter. Depending on the ratio of diameters, the intensity ratio, which is also referred to as the split ratio, can be set during operation.

In accordance with a particularly advantageous configuration, this intensity ratio (split ratio at the first junction) is now adjusted in such a way that, given a predetermined splitter cascade with a predetermined number of splitters and a predetermined number of subscriber/consumer outputs, the split ratio is different in each splitter, to be precise preferably in such a way that the same optical intensity is present at each subscriber output (in each case the same percentage proportion of the input intensity at the first splitter).

In accordance with a preferred implementation of the invention, the optical assembly comprises an optical component, in particular a splitter, to which, on at least one connection side, a connection carrier with optical fibers is coupled. Preferably, the optical component and the connection carrier have two mutually opposite, common cut edges, i.e. the two mutually opposite, parallel side edges of the optical assembly are formed as cut faces corresponding to the above-described production method. In particular, the side faces of the connection carrier are aligned with those of the optical component and form a continuously planar face therewith.

In accordance with a preferred development, the optical assembly has, on the output side, an in particular standardized multi-fiber plug. This is preferably coupled to the connection carrier. This facilitates fitting of such an optical assembly in situ since it is possible to make contact without any problems via a standardized plug-type connection.

With the above and other objects in view, there is also provided, in accordance with the invention, an assembly where a plurality of such optical assemblies are combined to form a splitter cascade. The splitter cascade of the invention comprises:

a plurality of optical assemblies each having a splitter with a conductor track pattern formed of a plurality of conductor tracks opening out at a connection side;

a connection mount coupled at the connection side, said connection mount having a number of optical fibers respectively coupled to said conductor tracks;

each splitter having an input, a plurality of consumer outputs and, apart from a last splitter of the splitter cascade, a loop-through output connected to the input of a respectively subsequent splitter;

said conductor track pattern being formed such that a total intensity of an optical signal applied at said input during operation is distributed in a defined manner corresponding to a splitting ratio among said consumer outputs and said loop-through output, wherein the splitting ratio is selected to satisfy one or both of the following conditions:

a total intensity provided at the consumer outputs of each splitter is identical; and/or an intensity provided at each of the consumer outputs of the splitter cascade is identical.

The method described here can be used for the production of different optical assemblies. Exemplary implementations are described, for example, in our commonly assigned international application entitled "Optical Assembly," PCT/EP2010/006931, published as WO 2011/057812. The copending application is herewith incorporated by reference in its entirety.

Other features which are considered as characteristic for the invention are set forth in the appended claims.

Although the invention is illustrated and described herein as embodied in a method for producing an optical assembly, optical assembly and splitter cascade, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A shows a wafer, on which a plurality of optical components are formed and to which in each case one connection carrier is coupled on the input side and on the output side, the connection carrier forming a fiber array;

FIG. 1B shows a number of optical assemblies, produced by separating the wafer with connection carriers illustrated in FIG. 1A along the cutting marks shown therein;

FIG. 2 shows an illustration similar to that in FIG. 1A, with the optical components alternately rotated through 180°;

FIG. 3 shows a simplified illustration of a splitter cascade with a total of four optical components in the form of splitters and a total of sixteen consumer outputs (subscriber outputs)

Functionally and structurally identical or corresponding parts are provided with the same reference symbols throughout the figures.

DETAILED DESCRIPTION OF THE INVENTION

Figure 4:
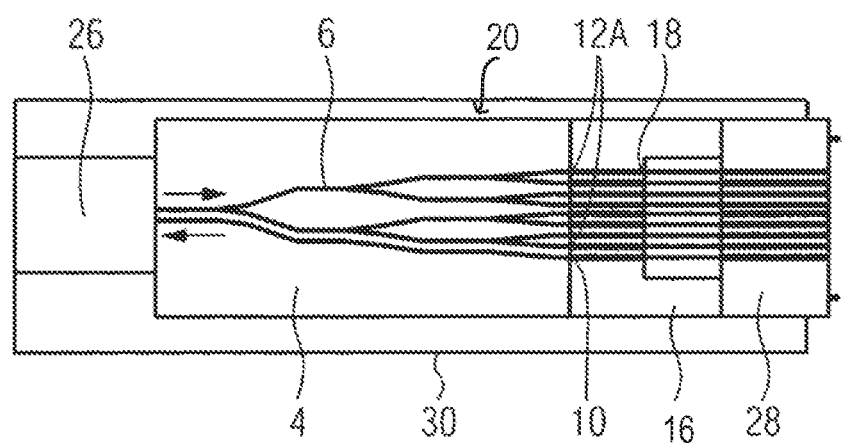
FIG. 4 shows an optical assembly with an optical component in the form of a splitter, in which fiber coupling is performed only on a single end side and an optical deflecting element, in particular in the form of a gradient lens, is arranged on the opposite end side.

Referring now to the figures of the drawing in detail and first, the production method will first be explained in more detail with reference to FIGS. 1A, 1B and 2. In a first step, first a large number of optical components, in the form of splitters 4 in the exemplary embodiment, is produced on a planar wafer 2, i.e. on a carrier substrate, in particular glass. The optical components are also referred to as so-called "chips" (planar optical waveguide chips). For this purpose, in each case one conductor track pattern 6 is produced for each splitter 4 on the wafer 2. This is performed in a manner known per se. Preferably, the conductor track patterns 6 are produced by an ion diffusion process, with the structuring of the conductor track pattern 6 preferably being performed lithographically via masking. In the ion diffusion process, the region of the conductor track pattern 6 is doped with special ions. That is, ions enter the carrier substrate. The wafer 2 is generally a planar disk, with the result that overall planar optical waveguide structures are formed.

At the end of this first step, a wafer 2 with a plurality of monolithically integrated splitters 4 is formed. These splitters are arranged one below the other in a row. The splitters 4 in this case each extend in a longitudinal direction, in which the conductor track pattern 6 also extends.

The conductor track pattern 6 runs from an input-side connection side 8A to an output-side connection side 8B. Starting at an end-side input 10, the conductor track pattern 6 has an input-side conductor track, which is split at a first junction into a loop-through conductor track and a supply conductor track, the supply conductor track then being split, by further junctions, into a plurality of consumer conductor tracks, which then open out at consumer outputs 12A. The loop-through conductor track opens out on the output side at a loop-through output 12B. The junctions are in each case Y junctions. By suitable selection of the geometry of the conductor tracks in the region of the respective junction, a defined intensity ratio of an optical signal applied during operation is set. The ratio between the loop-through conductor track and supply conductor track which is set at the first junction is then referred to as the split ratio or splitting ratio. This therefore indicates the ratio in respect of how the intensity I of an optical signal which is injected on the input side is split between the loop-through conductor track, on one side, and the consumer conductor tracks on the other side.

The wafer 2 forms in each case a completely flat and linearly extending plane at the connection sides 8A, 8B. This takes place in particular by special processing of the wafer 2, for example by cutting and/or polishing.

In the next step, at least on one connection side 8A, 8B, preferably on both connection sides 8A, 8B, a connection carrier 16 which is common to all of the splitters 4 is coupled to a wafer 2 prepared in this way with the integrated plurality of splitters 4, for example by means of adhesive bonding with a suitable adhesive. The common connection carrier 16 has in each case optical waveguide fibers 18, which are positioned in the connection carrier 16 in such a way that they are aligned precisely with the associated outputs 12A, 12B and inputs 10 of all of the splitters 4. The fibers 18 are arranged with the same grid pitch as the inputs 10 and outputs 12A, B on the wafer 2. By virtue of this measure, therefore, all of the splitters 4 are connected to optical fibers 18 parallel and simultaneously by virtue of only one coupling operation.

The connection carriers 16, for example likewise consisting of glass or else plastics, are in this case preferably formed in two parts and are separated into two halves at a horizontal partition plane. For precise alignment and positioning of the fibers 18, preferably in particular V-shaped grooves or notches are incorporated in one of these two parts, with the fibers 18 each being laid in said grooves or notches. The two form halves of the connection carriers 16 are connected to one another, for example by means of adhesive bonding, once the fibers 18 have been inserted.

After this production step, the intermediate manufacturing step illustrated in FIGS. 1A and 2 is achieved, in which in each case one connection carrier 16 is fastened on a wafer 2 with a large number of splitters 4 on the opposite connection sides 8A, 8B, with the result that the optical fibers 18 are coupled.

In the subsequent production step, this unit is separated along cutting marks 22—also referred to as dicing by sawing along the kerf lines 22—for example by means of a laser or a wafer saw or the like, so as to form individual optical assemblies 20. The individual optical assemblies 20 are produced, as illustrated in FIG. 1B. The longitudinal edges thereof are therefore in the form of cut edges 23, i.e. the result of the separating process.

The particular advantage of this production method can be considered that of coupling the optical fibers 18 with high precision in a cost-efficient and simple manner with a common connection carrier 16 for a large number of optical components (splitters 4).

The configuration and arrangement of the individual splitters 4 on the wafer 2 can be selected within wide ranges. It is critical that the optical components are arranged in such a way that only a maximum of two connection carriers 16 on mutually opposite connection sides 8A, 8B are required in order to couple all of the inputs 10 and outputs 12A, B to fibers 18.

Preferably, splitters 4 of a splitter cascade 24 are formed by virtue of this method, as is illustrated by way of example in FIG. 3. For reasons of simplicity, in this case in each case only the splitters 4 without the connection carrier 16 are illustrated. In the case of the splitter cascade 24, generally the intensity I applied to the input 10 of the first splitter 4 is split over a large number of consumer outputs 12A, which are provided by a plurality of splitters 4 of the splitter cascade 24. In the exemplary embodiment shown in FIG. 3, four splitters 4 are illustrated by way of example. In principle, more or fewer splitters can also be combined to form a splitter cascade 24. In the exemplary embodiment in FIG. 3, there are 1×5 splitters, i.e. one input 10 is in each case split into five outputs 12A, 12B. Only the last splitter has exclusively four consumer outputs 12A. As can be seen the respective loop-through output 12B is connected to the input 10 of the following splitter 4.

The first junction in the respective splitter 4 defines the split ratio. In FIG. 3, in each case the individual split ratios of the splitters 4 are specified by way of example. In the exemplary embodiment shown in FIG. 3, these split ratios are selected such that all of the consumer outputs 12A are supplied with the same proportion of the total intensity $I_1$ of the optical signal present at the input 10 of the first splitter 4 during operation. In the exemplary embodiment, in total 16 consumer outputs 12A are provided, with the result that a sixteenth of the total intensity $I_1$ is apportioned to each consumer output 12A. In order to achieve this, the split ratios in the individual splitters 4 are selected differently. It generally applies for this split ratio that the proportion of the partial intensity $I_2$, $I_3$ present at the input 10 of the respective splitter 4 which is intended to be split over the consumer outputs 12A corresponds to 1/(k+1) of this partial intensity $I_1$, $I_2$. k in this case indicates the number of splitters which still follow the respective splitter in the splitter cascade 24. In the case of the four splitters illustrated in the exemplary embodiment, this results in the following split ratios:

| | |
|---|---|
| splitter 1 | 25% to 75% |
| splitter 2 | 33% to 66% |
| splitter 3 | 50% to 50% |
| splitter 4 | 100% |

The last splitter 4 therefore no longer has a loop-through output 12B. Overall, this also ensures that the same consumer intensity $I_n$ is split over the entirety of the consumer outputs 12A of each splitter 4, where n is the number of consumers, and $I_n = I_1/n$.

For the case in which the individual splitters 4 have a different number of consumer outputs 12A, the split ratio can also be selected differently. Preferably, the split ratios are set in such a way that the same intensity is present at each consumer output 12A of the entire splitter cascade 24.

Preferably, all of the splitters 4 of a splitter cascade 24 are formed on a common wafer 2 in the production method and are formed with the connection carriers 16 and the optical fibers 18 contained therein.

In general, the optical fibers 18 extend through the respective connection carriers 16 and emerge at the end thereof opposite the splitter 4 as a fiber bundle (on the output side) or as individual fibers (on the input side). The fiber 18 present at the loop-through output 12B is connected to the input 10 of the following splitter 4 in the case of a splitter cascade 24, in particular via the input-side connection carrier 16 of said following splitter.

In the exemplary embodiment shown in FIG. 1B, the optical assembly 20 has in each case one connection carrier 16 with optical fibers 18 both on the input side and on the output side. In an alternative variant embodiment illustrated in FIG. 4, a connection carrier 16 is provided on only one side. This is primarily advantageous for a particularly compact design of the optical assembly 20. On that end side of the optical component, which is likewise in the form of a splitter 4 here, which is opposite the connection carrier 16, a deflecting element 26 which is in particular in the form of a lens is provided instead of a connection carrier provided with fibers 18. This is preferably a so-called gradient lens. All of the inputs 10 and outputs 12A coupled to fibers 18 are present merely on one end side of the optical component 4, with the result that single-sided fiber coupling is required only on one side.

In the exemplary embodiment shown in FIG. 4, in addition a multi-fiber plug 28 is also coupled to the connection carrier 16, said multi-fiber plug being standardized in respect of its properties, such as grid pitch, plug-type connection technology etc. The multi-fiber plug 28 makes it possible to connect a fiber bundle via a likewise standardized plug with a complementary design with respect thereto. To this extent, simple connection of an entire fiber bundle is made possible. The multi-fiber plug 28 forms, together with the optical component 4, the connection carrier 16 and the deflecting element 26, the optical assembly 20, which is arranged as such in a housing 30. In this case, the multi-fiber plug 28 is accessible from the exterior so as to provide the possibility of a plug-type connection. It is also possible for a plurality of such optical assemblies 20 to be arranged in the housing 30, with it being possible for each optical assembly to be connected via a dedicated multi-fiber plug 28.

The variant embodiment shown in FIG. 4 with the fiber coupling merely on one side is described in detail in our above-mentioned international application PCT/EP2010/006931, which is incorporated herein. To this extent, reference is made to the description of our other disclosure.

The method described here for producing an optical assembly 20 is used in particular for inexpensive production and formation of splitter components in fiberoptic transmission systems, which will in future to an ever increasing extent replace conventional copper-wire transmission systems. Therefore, the splitter components are required in ever increasing numbers, which provides the necessity for economic and inexpensive manufacture.

There is also the associated demand for a design which is as compact as possible and involves little fitting complexity. The splitter components are typically arranged in the vicinity of the end subscribers, for example in a manner comparable to electrical distribution boxes for power supply. By virtue of the measures described here, a prefabricated optical assembly 20 which is inexpensive to produce is provided as splitter component (splitter 4 or else splitter cascade 24) which can be used in situ at the splitter point (junction boxes) with only little fitting complexity. The solution described here is characterized overall by the following points, which are preferably provided in their entirety:

The plurality of optical components 4 is formed on a common wafer 2 and adjusted with respect to one another with a high degree of (lithographic) accuracy. All of the optical components 4 are coupled simultaneously in one go using a common connection carrier 16 (preferably both on the input side and on the output side).

Preferably all of the splitters 4 required for a splitter cascade 24 are arranged on a common wafer 2.

The same optical power (same intensity $I_n$) is provided at each consumer output 12A; each splitter 4 used in the splitter cascade 24 thus has a different asymmetrical split ratio.

For a high-precision arrangement of the optical fibers 18, said optical fibers are formed within the connection carrier 16 in a V-shaped pit array. Preferably, the V-shaped pits are formed in the connection carrier 16 continuously corresponding to the grid pitch of the conductor tracks of the optical component 4, with only those V-shaped pits being occupied to which an input 10 or an output 12A, 12B is also associated.

The following is a list of reference symbols used in the above description, for aiding the reader in an easy understanding of the specification:

2 Wafer
4 Splitter
6 Conductor track pattern
8A Connection side
8B Connection side
10 Input
12A Consumer output
12B Loop-through output
16 Connection carrier
18 Optical waveguide fiber
20 Assembly
22 Cutting mark
23 Cut edge
24 Splitter cascade
26 Deflecting element
28 Multi-fiber plug
30 Housing
I Intensity

The invention claimed is:

1. A method for producing a splitter cascade formed of a plurality of optical assemblies, each including a respective optical component, the method which comprises:
   in a first step, forming a plurality of optical components in the form of splitters on a common wafer, each splitter having an optical conductor track pattern that opens out on a connection side and having at least one conductor track which splits into a plurality of output-side conductor tracks;
   in a second step, coupling optical fibers to the respective optical conductor track pattern simultaneously at a plurality of the splitters; and
   subsequently separating the individual components with the coupled optical fibers from one another;
   connecting a plurality of splitters to form a splitter cascade, wherein the conductor track patterns are formed such that the splitters of the splitter cascade each have an input, a plurality of consumer outputs and a loop-through output, except for a last splitter of the splitter cascade only having the consumer outputs, and such that a same optical intensity is present at all consumer outputs of the splitter cascade during operation, the optical intensity being lower than the respective intensity at the loop-through output, and/or that the total intensity provided at the consumer outputs of each splitter is identical, a respective loop-through output being connected to the input of a subsequent splitter.

2. The method according to claim 1, wherein the optical fibers lie in a common connection mount coupled to the common wafer.

3. The method according to claim 1, which comprises in each case coupling optical fibers with the aid of a respective connection mount on both sides of the optical components.

4. The method according to claim 1, which comprises forming the connection sides of all of the components to lie in a common flat plane.

5. The method according to claim 1, which comprises structuring the conductor track pattern lithographically.

6. The method according to claim 5, which comprises forming the conductor track pattern by an ion exchange process.

7. The method according to claim 1, which comprises forming the outputs with a predetermined grid pitch.

8. The method according to claim 7, which comprises forming the outputs with a grid pitch of approximately 250 μm or 125 μm.

9. The method according to claim 1, which comprises forming all of the splitters of the splitter cascade jointly on the wafer.

10. A splitter cascade, comprising:
   a plurality of optical assemblies each having a splitter with a conductor track pattern formed of a plurality of conductor tracks opening out at a connection side;
   a connection mount coupled at the connection side, said connection mount having a number of optical fibers respectively coupled to said conductor tracks;
   each splitter having an input, a plurality of consumer outputs and, apart from a last splitter of the splitter cascade, a loop-through output connected to the input of a respectively subsequent splitter;
   said conductor track pattern being formed such that a total intensity of an optical signal applied at said input during operation is distributed in a defined manner corresponding to a splitting ratio among said consumer outputs and said loop-through output, wherein the splitting ratio is selected to satisfy one or both of the following conditions:
   a total intensity provided at the consumer outputs of each splitter is identical; and/or
   an intensity provided at each of the consumer outputs of the splitter cascade is identical; and
   wherein each splitter is asymmetrical such that the optical signal is split asymmetrically between a loop-through conductor track and a consumer conductor track.

* * * * *